No. 729,928. PATENTED JUNE 2, 1903.
A. T. HAGEN, D. M. COOPER & J. KANE.
MANGLE.
APPLICATION FILED JULY 8, 1901.
NO MODEL. 3 SHEETS—SHEET 1.
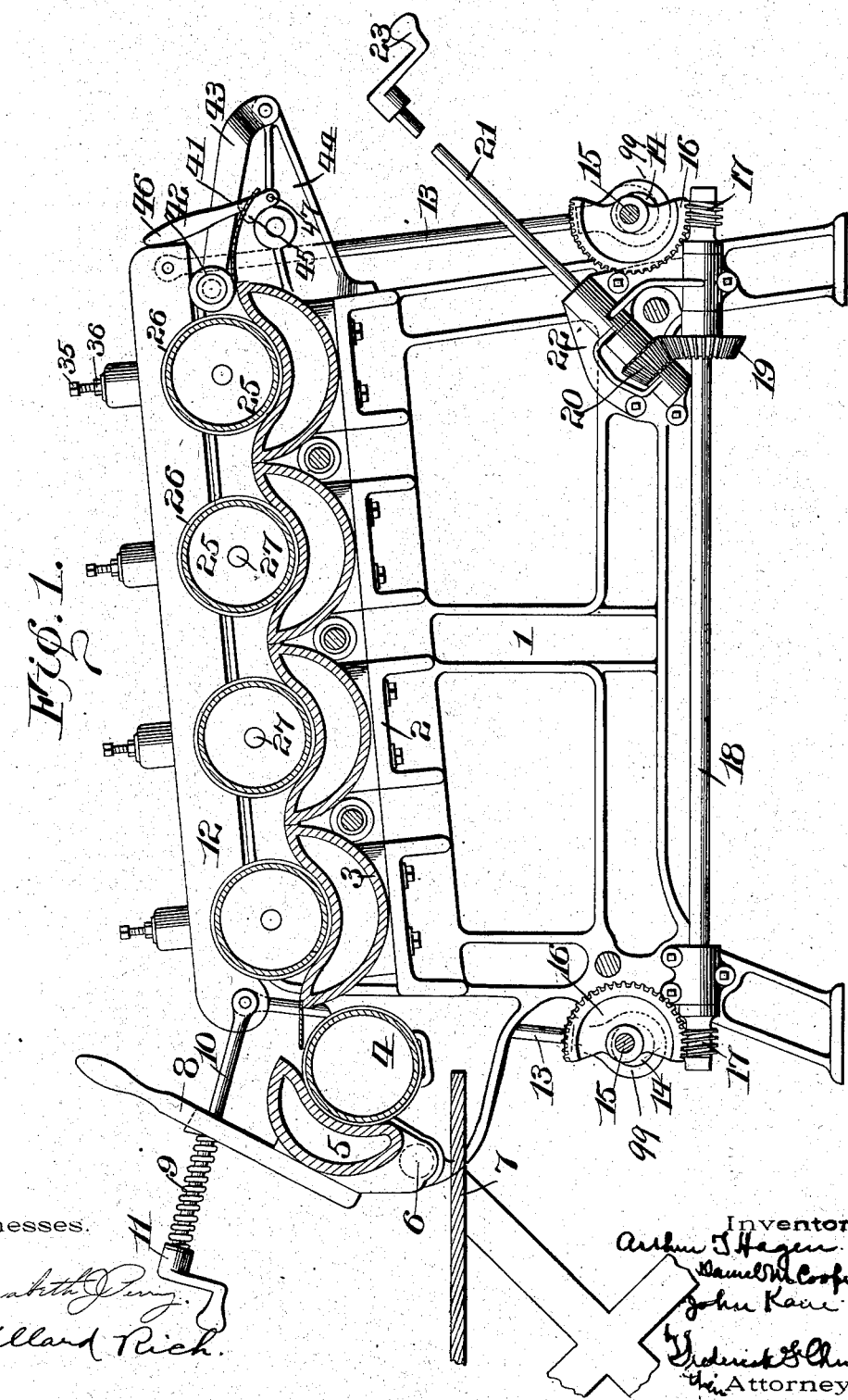
Witnesses.
Inventors.
Arthur T. Hagen
Daniel M. Cooper
John Kane
Frederick G. Church
Attorney.

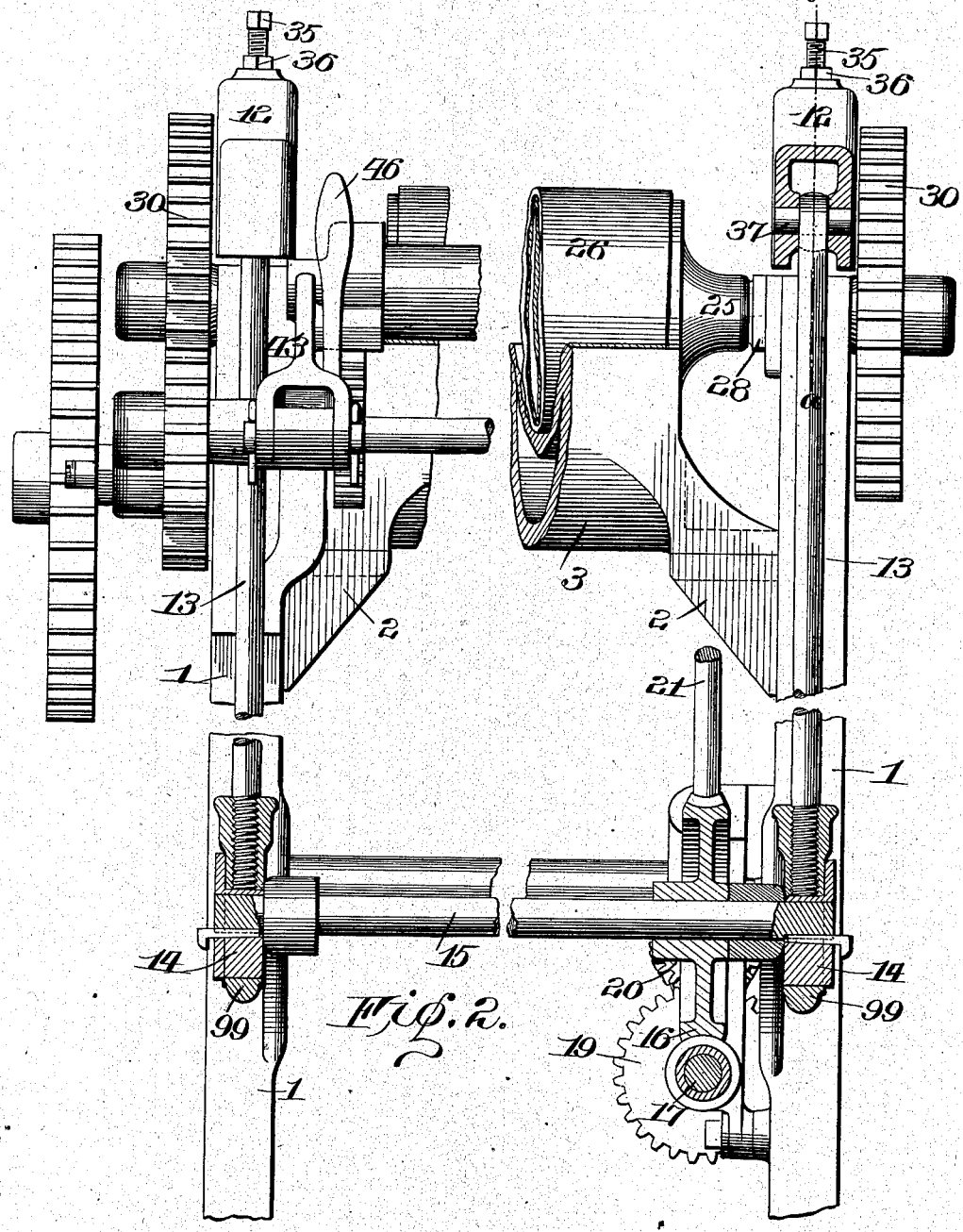

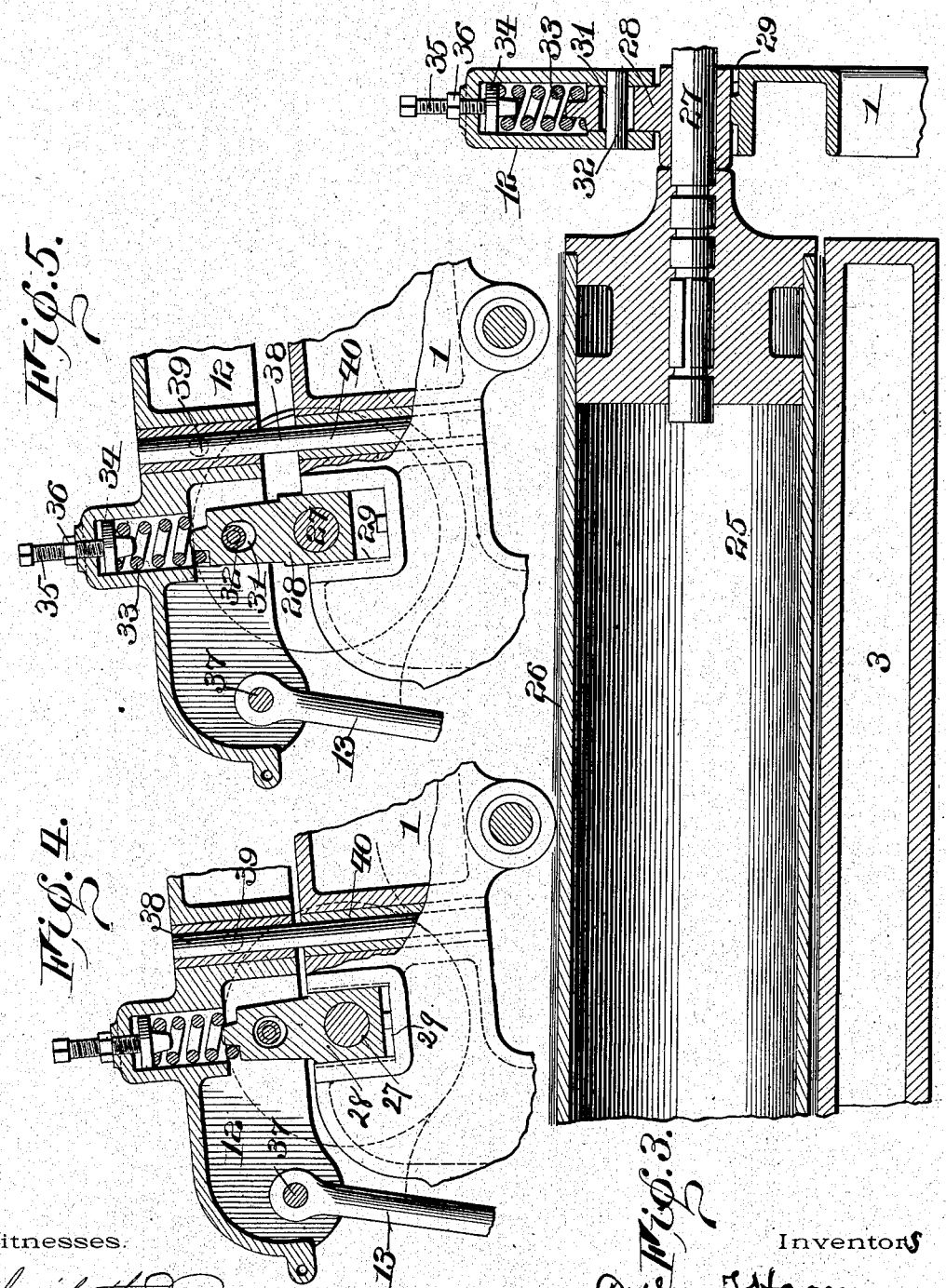

No. 729,928. Patented June 2, 1903.

UNITED STATES PATENT OFFICE.

ARTHUR T. HAGEN, DANIEL M. COOPER, AND JOHN KANE, OF ROCHESTER, NEW YORK, ASSIGNORS TO A. T. HAGEN COMPANY, OF ROCHESTER, NEW YORK, A CORPORATION OF NEW YORK.

MANGLE.

SPECIFICATION forming part of Letters Patent No. 729,928, dated June 2, 1903.

Application filed July 8, 1901. Serial No. 67,400. (No model.)

*To all whom it may concern:*

Be it known that we, ARTHUR T. HAGEN, DANIEL M. COOPER, and JOHN KANE, of Rochester, in the county of Monroe and State of New York, have invented certain new and useful Improvements in Mangles; and we do hereby declare the following to be a full, clear, and exact description of the same, reference being had to the accompanying drawings, forming a part of this specification, and to the reference-numerals marked thereon.

Our present invention relates to ironing-machines or mangles of that class in which the articles to be ironed are subjected to the action of a plurality or series of padded rollers coöperating with an ironing-surface preferably formed of separate though adjacent troughs or heated ironing - sections—such, for instance, as shown in Patent No. 451,479, granted to Arthur T. Hagen and Daniel M. Cooper May 5, 1891; and it has for its object to provide improved means for adjusting the rollers and ironing-troughs relatively, whereby the operator may accomplish the necessary adjustments by the operation of a single part, all as will be hereinafter fully described, the novel features being pointed out in the claims at the end of this specification.

In the drawings, Figure 1 is a longitudinal sectional view of an ironing-machine embodying our improvements; Fig. 2, a view looking from the feed end of the machine with a portion of the adjusting mechanism shown in section and the intermediate portion of the rolls and troughs being broken away and showing a portion of the gearing for operating the rollers. Fig. 3 is a vertical sectional view through one end of one of the padded rollers and a portion of the side frame. Figs. 4 and 5 are vertical sectional views on the line *a a* of Fig. 2, showing the padded rollers in lowered and raised positions, respectively.

Similar reference-numerals in the several figures indicate similar parts.

The main frame of the machine does not differ essentially from that shown in said prior patent, embodying the sides 1, having the shelves or brackets 2 attached to the inner sides thereof, upon which the steam-heated troughs or ironing - sections 3 are mounted, the upper portions of said troughs or sections being concave, as shown in Fig. 1, and having their adjacent edges abutting, so that practically a continuous corrugated ironing-surface is formed from the front or right-hand end, Fig. 1, to the delivery end of the machine.

4 indicates a roller mounted in suitable bearings in the side frame, to the upper portion of which the goods operated upon are delivered from the last trough, and 5 is a heated trough or iron pivoted at 6 and between which and the roller 4 the goods are passed prior to their delivery upon the receiving-table 7, this last trough 5 serving to give a slight finish to the upper sides of the goods. Connected to the trough 5 are rods or extensions 8, operated upon by springs 9, encircling the rods 10, which latter are threaded at their outer ends and provided with adjustable crank-nuts 11 to vary the pressure between the trough 5 and roller 4. The forward ends of the rods 10 are pivotally secured to the side bars 12, one of which is arranged over each of the side frames and supported at the ends upon rods or bars 13, pivoted to them, and having their lower ends adjustably connected to straps 99, encircling cams or eccentrics 14 on the shafts 15, extending transversely of the machine and mounted in suitable bearings in the side frames. Each of the shafts 15 has near one end a segmental worm wheel or gear 16, meshing with worms 17 on the ends of a shaft 18, extending longitudinally of the machine and provided near one end with a beveled gear 19, meshing with a corresponding pinion 20 on an inclined shaft 21, journaled in a bracket 22, the upper end of said shaft having an operating-handle 23 arranged in proximity to the feed end of the machine, as shown, so that by the manipulation of said handle the operator can when desired elevate the rods or bars 13 and the side bars 12, which latter being connected constitute a frame to regulate the pressure upon the ironing-rolls or to lift the latter out of contact with the troughs, as will be described. The ironing-rolls 25, one for each trough 3, are, as usual, hollow, and their surface is preferably covered with suitable padding 26, and said rollers are each provided at the ends with suitable journals 27, operating in journal boxes or bearings 28, guided to move vertically in recesses 29, formed in the upper sides of the side frames 1 of the machine. (Shown in Figs. 3 to 5.) The usual gears 30 for rotating the rollers 25 are applied to the outer ends of the shafts 27, as shown at the right in Fig. 2, and are connected in such manner that all of the padded rollers move at approximately the same surface speed—as shown, for instance, in said prior patent. The under sides of the side frames or bars 12 are recessed to render the parts lighter and also to receive the upper ends of the bearing-blocks 28, which latter are provided with transverse apertures 31, through which extend bolts or pins 32, secured to the bars 12.

33 indicates springs located in suitable recesses in the bars 12 and bearing at their lower ends upon the upper ends of the bearing-blocks 28, their upper ends being acted upon by plates or washers 34, with which coöperate set-screws 35, extending through threaded apertures in the bars 12 and provided with suitable locking-nuts 36. The connections between the lifting-rods 13 and the side bars 12 being pivotal ones, formed by bolts or studs 37, we provide at each end of the bars 12 means for guiding the latter in right lines relatively to the side frames 1 and in the present instance secure guide-rods 38 to the bars 12—as, for instance, by bolts or set-screws 39, (shown in dotted lines in Figs. 4 and 5 and entering from the outside)—the lower portion of said rods 38 extending into recesses in the side frames 1, a suitable filling of Babbitt metal 40 being interposed between the rod and frame, as shown in Figs. 4 and 5, in order to form smooth, true, and practically-antifriction bearings. The apertures 31 in the bearing-blocks 28 are sufficiently large to permit the padded rollers 25 to be held yieldingly by the springs 33 down upon the troughs when the bars 12 are in the position shown in Fig. 4—that is, when they are moved downward by the eccentrics 14—so that the rollers may yield relatively to the troughs as the goods pass through beneath them, and by the manipulation of the handle 23 and the rotation of the shafts carrying the eccentrics the pressure exercised by all of the rolls may be varied simultaneously. When, however, it is desired to lift all of the rollers out of contact with the ironing-troughs, as when the machine is not running and the padded covering for the rollers would be liable to be scorched, the bars 12 may by the operation of the eccentric-shafts be lifted bodily to the position shown in Fig. 5, when the studs or bolts 32 will engage the upper portions of the apertures 31 and lift the bearing-blocks 28 bodily vertically, carrying with them all of the rollers.

The bars 12 being connected for simultaneous operation constitute a frame, although said bars are separately and relatively adjustable, if desired, by the threaded connection between the straps 99 and the rods 13.

At the feed end of the machine is arranged a plate or table 41, on which the articles to be ironed are placed preparatory to their introduction beneath the first ironing-roller, a movable and driven feed-roller 42, mounted on the free ends of arms 43, pivoted in brackets 44, being arranged over said plate and adapted to be elevated for the introduction of the article by a cam 45 on an arm 46, pivoted at 47 on the bracket 44, as shown in Figs. 1 and 2. This form of adjusting mechanism is found in practice to be eminently desirable, and the bolts 35, controlling the pressure exerted by the springs 33, being once adjusted the operator may by the manipulation of a single part vary the pressure exerted upon the goods or lift the ironing-rolls out of contact when there is danger of injuring the padding upon the rollers 25.

We claim as our invention—

1. In a mangle, the combination with the main frame having the stationary heated ironing-surface thereon, of the padded ironing-rollers, bearings therefor engaging and guided on the main frame, the adjustable frame movable toward and from the ironing-surface, and arranged to engage the bearings of the rollers when moved away from the ironing-surface, and springs arranged between the outer sides of said bearings and the frame, whereby the pressure between the rollers and ironing-surface may be varied or the rollers removed by the adjustment of said frame.

2. In a mangle, the combination with the main frame having the stationary heated ironing-surface thereon, of the rollers, the vertically-adjustable frame extending above the latter, the bearings for the rollers engaging and guided on the main frame and arranged to be engaged by the adjustable frame when the latter is moved away from the ironing-surface, and springs arranged between the bearings and adjustable frame for holding the rollers in yielding contact with the ironing-surface.

3. In a mangle, the combination with the main frame and the ironing-surface thereon, of the vertically-adjustable side bars connected for simultaneous operation, the rollers coöperating with the ironing-surface, the bearings for the rollers engaging and guided on the main frame, springs arranged between the bearings and side bars and connections between the bars and bearings permitting a limited movement of the roller-bearings independently of the bars but causing the bearings to be lifted by the bars when the latter are moved away from the ironing-surface.

4. In a mangle, the combination with the main frame and the ironing-surface thereon, of the vertically-movable side bars having the pins, connections between the bars for causing their simultaneous operation, the rollers, bearings therefor engaging and guided upon the main frame, having the slots in which the pins on the bars operate, and the springs arranged between the bearings and bars.

5. In a mangle, the combination with the main frame, and the ironing-surface thereon, the bearing-blocks guided on the main frame and the vertically-movable side bars connected for simultaneous operation extending over the blocks, of connections between the bars and blocks for lifting the latter when the bars are lifted and permitting a vertical movement of the blocks independently of the bars, the springs arranged between the bearings and bars, and the ironing-rollers journaled in the bearings and coöperating with the ironing-surface.

6. In a mangle, the combination with the main frame, and the ironing-surface thereon, of the side bars recessed in their under sides and having the pins, the bearings guided on the main frame having the slots for the pins on the bars, springs arranged between the upper portions of the bearings and bars, and means for simultaneously adjusting the bars toward and from the ironing-surface.

7. The combination with the main frame, the ironing-surface thereon, the side bars extending over the frame, and guides between the bars and frame, of the ironing-rollers, the bearings therefor arranged beneath the bars and a slot-and-pin connection between the bars and bearings permitting a limited independent movement, springs interposed between the bars and bearings, the lifting-rods pivoted to the ends of the side bars and means for operating said rods simultaneously.

8. The combination with the main frame, the ironing-surface thereon, and the rollers coöperating with said surface, of the bearings for the rollers, guided on the main frame, the side bars connected to the bearings to lift them but having a limited movement independent of the bearings, the springs between the bearings and bars and the transverse shafts having the operating-cams, lifting-rods connected to the ends of the side bars and means for adjusting their length, connections between said shafts, and a single operating device for rotating the shafts and moving both ends of both side bars at a single operation.

9. In a mangle, the combination with the main frame and the ironing-surface thereon, the adjustable side bars arranged over the frame, the vertical rods connected to each of the bars and connections for simultaneously adjusting all said rods vertically to raise the bars, of the rollers coöperating with the ironing-surface, bearings therefor arranged beneath the bars and guided on the main frame, connections between the bearings and bars whereby the former are operated vertically by the latter but have a limited movement independently of the side bars, and springs interposed between the bearings and bars for pressing the former toward the ironing-surface.

ARTHUR T. HAGEN.
DANIEL M. COOPER.
JOHN KANE.

Witnesses:
G. WILLARD RICH,
ELIZABETH J. PERRY,